(12) United States Patent
Edwards

(10) Patent No.: US 12,179,810 B2
(45) Date of Patent: Dec. 31, 2024

(54) RAIL VEHICLE PROVIDED WITH AN END WALL, A DOORWAY, AND FOOTPLATE CATCHERS

(71) Applicant: Bombardier Transportation GmbH, Berlin (DE)

(72) Inventor: Jonathan Edwards, Derby (GB)

(73) Assignee: Bombardier Transportation GmbH, Berlin (DE)

( * ) Notice: Subject to any disclaimer, the term of this patent is extended or adjusted under 35 U.S.C. 154(b) by 793 days.

(21) Appl. No.: 17/375,074

(22) Filed: Jul. 14, 2021

(65) Prior Publication Data

US 2022/0017123 A1    Jan. 20, 2022

(30) Foreign Application Priority Data

Jul. 16, 2020    (GB) ........................................ 2010996

(51) Int. Cl.
*B61D 17/20*    (2006.01)

(52) U.S. Cl.
CPC .................................... *B61D 17/20* (2013.01)

(58) Field of Classification Search
CPC ......... B61D 17/04; B61D 17/06; B61D 17/20
See application file for complete search history.

(56) References Cited

U.S. PATENT DOCUMENTS

2006/0107865 A1 * 5/2006 Kobayashi ............. B61D 17/20
                                                              105/460

FOREIGN PATENT DOCUMENTS

EP           0685375 A1    12/1995
EP           2700553 A1    2/2014

\* cited by examiner

*Primary Examiner* — Robert J McCarry, Jr.
(74) *Attorney, Agent, or Firm* — The Webb Law Firm

(57) ABSTRACT

A rail vehicle has a carbody shell having an end wall and a usable space. The end wall includes a doorway for providing access to the usable space, and at least two footplate catchers for preventing a set of footplates arranged adjacent to the footplate catcher from entering the usable space, such as in an event of a crash.

13 Claims, 5 Drawing Sheets

RAIL VEHICLE PROVIDED WITH AN END WALL, A DOORWAY, AND FOOTPLATE CATCHERS

CROSS-REFERENCE TO RELATED APPLICATION

This application claims priority to United Kingdom Patent Application No. 2010996.3 filed Jul. 16, 2020, the disclosure of which is hereby incorporated by reference in its entirety.

BACKGROUND OF THE INVENTION

Field of the Invention

The present invention relates to a rail vehicle, particularly to an end wall of a rail vehicle.

Description of Related Art

EP 0 685 375 discloses a connecting pathway between rail vehicles with a bridge assembly. Such a bridge assembly is known from EP 2 700 553. The bridge assembly comprises footplates such as a treadplate and two bridge plates. Each bridge plate is connected to a rail vehicle in the area of a rail vehicle end; the treadplate resting on the bridge plates. The tread plate can be hinged to an adjacent rail vehicle end, to a free-end frame, or to a scissor type frame supporting the footplates. The tread plate includes a base plate horizontally hinged to the adjacent rail vehicle or the free-end frame, and an extension plate slidably attached to the base plate. The extension plate and the bridge plate both contain engaging members facing each other at a distance.

When the distance between the vehicles, or between the vehicle and the free-end frame decreases abnormally in a collision accident of the vehicle, the distance between the engaging members decreases, down to a point where the engaging members engage each other and reduce the length of the treadplate, thereby preventing the extension plate to enter the usable space. Other features of the footplate apparatus ensure that further reduction of the distance between the vehicles, or between the vehicle and the free-end frame, combined with a pitching of the vehicle will result in a downward movement of the footplate, so that the vertical distance between the usable space floor and the tip of the extension plate remains limited. The elevation of the extension plate tip thus does not present an additional hazard to passengers' legs.

A set of two rail vehicles or more have the gangways mounted in a recess at the end of the rail vehicles. By having the gangway recessed, when a collision occurs, the gangway has space to collapse into. This then allows the two rail vehicles to come together, passing the crash load down the train. In such a case, the gangway footplates would just slide together.

In the absence of such recess, as the gangway compresses, the opposing hinged bridge plates come together and can sever the connection between the treadplate and the bolt that connects the center of the treadplate to the rest of the bridge assembly, the treadplate thus becoming loose.

The state of the art does not address the dangers of, nor any remedies for, a footplate (bridge plate or treadplate) becoming loose, as could happen during a major collision.

There is a clear need for an improved safety device that reduces the risks inherent to a loose footplate in the event of a collision.

SUMMARY OF THE INVENTION

According to a first aspect of the invention, there is provided a rail vehicle, the rail vehicle defines a vertical median plan and comprises a carbody shell having an end wall. The end wall can comprise a doorway, providing access to a usable space of the carbody shell. The doorway comprises lateral walls and a threshold. The threshold is substantially flush with a floor of the usable space, so as to avoid any tripping hazard for passengers. The end wall further comprises at least two footplate catchers located at a distance of each other, each laterally outside the threshold. A gangway connected to the end wall defines a passage towards an adjacent rail vehicle. A bridge assembly within the gangway defines a lower limit of the passage. The bridge allows passengers to move from one rail vehicle to the adjacent rail vehicle. Such a bridge assembly usually comprises a set of one or more footplates for passengers to walk onto. The footplates are substantially aligned with the threshold of the doorway and supported by one or more scissor-type frame. The footplate catchers are arranged adjacent to the set of one or more footplates. In particular, the footplate catchers prevent a set of one or more footplates having a width greater than the distance between the at least two footplate catchers from entering the usable space, in particular in the event of a crash.

The carbody shell can be made of metal, in particular of hollow aluminum extruded members having faces and ribs connecting the faces. The carbody shell denotes elements such as roof sections, sidewall sections, end wall sections and roof sections, which separate an interior, usable space, from an exterior space, in particular an external environment. The usable space can be a passenger compartment or a vestibule of the rail vehicle.

Sidewall sections of the carbody shell can provide openings, in particular windows and door openings. A sidewall section can be a substantially vertical section of the carbody shell providing a long side of the rail vehicle.

Further to the sidewall sections, the carbody shell elements can also comprise a roof section and a floor section. The roof section and the floor section can be connected by the sidewall sections.

In this case, the usable space can also be enclosed by the roof section and the floor section of the vehicle wall, so that the carbody shell has a substantially tubular shape.

End wall sections can be carbody shell elements providing end walls, and end faces of the rail vehicle. End walls sections can be sections at the first end and/or at the second end of the rail vehicle. An end face can be a face of the carbody facing an adjacent rail vehicle and providing connecting means for attaching a gangway device, at a gangway section of the rail vehicle.

An end wall can comprise a first face facing the outside, such as an end face of the rail vehicle, and a second face facing the inside of the rail vehicle, for example facing the usable space. The first face and the second face belong respectively to an inner plate and an outer plate that are substantially parallel and located at a distance from each other in the longitudinal direction. The inner plate and the outer plate can be connected by intermediate ribs.

The distance between the inner and outer plates thus provides empty space while the ribs ensure a structural solidity. The distance between the inner plate and the outer plate allows to accommodate the footplate catchers. Preferably, the footplate catchers are arranged between the inner plate and the outer plate. Preferably, the end walls comprise hollow aluminum extrusions, the cavities within the hollow extrusions can receive the footplate catchers.

According to another aspect of the invention, the doorway provided in the end wall includes a recess. Preferably, the recess is located at the bottom of the doorway. forming a space for accommodating the footplate catchers, wherein the footplate catchers are arranged outside the usable space.

The recess can extend partially through the end wall. The recess can also extend entirely though the end wall and thus connect the usable space to the gangway section. In other words, the recess can connect the usable space to the gangway section, in the same manner as the doorway. The recess has a width that is greater than the width of the set of one or more footplates. The recess is adapted to receive at least one loose footplate at least partially in a substantially horizontal direction, whenever a collision occurs, and one or more footplate becomes loose.

According to a further aspect, the recess can comprise two notches, at least partially located at the bottom corners of the doorway. The two notches can face each other, each notch being located on either side of the doorway, respectively on a left and right sides of a vertical median plane. The notches running through both plates and through the ribs forming the aluminum member, from the first face to the second face of the end wall. The notches are preferably located at or next to the bottom corners of the doorway. The two notches can, for example, be obtained by laser-cutting. Preferably, the notches extend above and below the threshold, in the vertical direction.

The size of the notches is based on the assumptions made during the design of the rail vehicle. In particular, the potential movements between two adjacent rail vehicles, and the subsequent movements of the footplates. During extreme rolling and/or pitching and/or transverse offset of the adjacent rail vehicles, the bridge assembly will not be horizontal and thus not aligned with the threshold. The recess and the notches must provide clearance for the footplates to be received by the recess. In particular, the height of the notches should be such that the recess can receive a loose footplate whatever the rail vehicle's rolling conditions are, especially for non-articulated sets of rail vehicles for which very large relative movements between adjacent rail vehicles can occur. Preferably, the height of the notches, measured from the threshold, should be between 20 mm and 200 mm, more preferably between 75 mm and 150 mm. The lower portion of the notches can extend below the threshold.

According to further aspect of the invention, the footplate catchers may each comprise at least one retainer arranged at least partially within the recess. Each retainer can be located in a respective notch, on either side of the doorway. The aim of the retainers is to stop and/or hold at least one loose footplate from the set of one or more footplates. The retainers act as safety devices, in that they hinder a loose footplate (treadplate or bridge plate) from entering the usable space, in the event of a collision.

Preferably, the retainers are located at a distance from each other, said distance being smaller than the width of the set of one or more footplates.

In the transverse direction, the notches extend beyond the set of one or more footplates, so that the recess is large enough to receive the footplates.

Preferably, the retainers are arranged in a manner such that the retainers are not visible to the passengers. More preferably, the retainers should be located within the end wall rendering the footplate catchers invisible to the passengers.

In a preferred embodiment, the retainers each comprise a sheet metal element. The retainers comprise a stop for stopping a footplate moving toward the usable space. The retainers may further comprise legs, preferably a first leg extending from the stop in a direction upwards, a second leg extending from the stop in a direction downwards. The extremity of at least one leg may be connected to the carbody shell. Preferably, the extremities of both legs are connected to the carbody shell. More preferably, the extremities of both legs are connected to the end wall. The first leg and the second legs extending from the stop form an indentation for receiving at least one loose footplate.

The thickness of the sheet metal element may vary between 1 mm and 5 mm depending on the material grade. Preferably, the steel plate is obtained from a 3 mm thick, preferably a grade S355 steel. It should also be appreciated that the retainers could be made of other types of material providing the required elasticity and strength.

The retainers should preferably extend vertically above and below the recess, so that any one or more footplate entering the recess while moving towards the usable space, will collide with the retainers.

The retainers are preferably designed so that they can deform elastically upon impact of the footplates. The retainers can be curved, in particular substantially shaped like an S. The S-shape provides elasticity to the retainers, so that the retainers act like springs. The S-shape allows to absorb the energy of a thrusting footplate. Upon collision, the retainers can unfold and, while unfolding, dissipate the kinetic energy from footplate.

The retainers preferably have a shape which also provides guidance for a loose footplate. The shape, in particular an S-shape, is such that a loose footplate moving from the gangway section towards the usable space will be guided downwards by the indentation, towards the stop of the retainer and thus also towards the threshold. Such arrangement makes it possible for the footplate catchers to stop any loose footplate. Such S-shape retainers can be obtained by bending sheet metal elements.

The first leg of the retainers can be designed as a guiding portion for a loose footplate, guiding a loose footplate downwards, towards the floor level when the loose footplate moves towards the usable space. Preferably, the stop can be located adjacent to, or below the floor level.

In a preferred embodiment, the retainers have a first mounting interface located at the first leg's extremity and a second mounting interface located at the second leg extremity. The second leg can further comprise a bend between the stop and the second mounting interface. Bending the metal sheet allows to increase the length of the retainers, thus increasing their flexibility, while keeping a limited envelope. Mounting interfaces are adapted for connecting the extremities of the legs at a mounting surface of the carbody shell, in particular at the end wall.

The footplate catchers could be an integral part of the end wall. The extrusion process could provide for the retainers to be part of the aluminum members. More specifically, a part of the aluminum members within the end wall could provide the retainers needed to catch and/or hold a loose footplate in the event of a collision.

It should also be appreciated that the retainers could be made of other types of material providing the required elasticity and strength A set of railway vehicles comprising at least two rail vehicles and a gangway arranged in between, at least one rail vehicle is designed according to the invention. The gangway comprises at least one footplate. The footplate catchers are located on the path of a loose footplate moving towards the usable space. The footplate catchers are operative to prevent at least one loose footplate from entering the usable space, in the event of a collision.

BRIEF DESCRIPTION OF DRAWINGS

Other advantages and features of the invention will then become more clearly apparent from the following description of a specific embodiment of the invention given as non-restrictive examples only and represented in the accompanying drawings in which.

DESCRIPTION OF THE INVENTION

Figure 1:
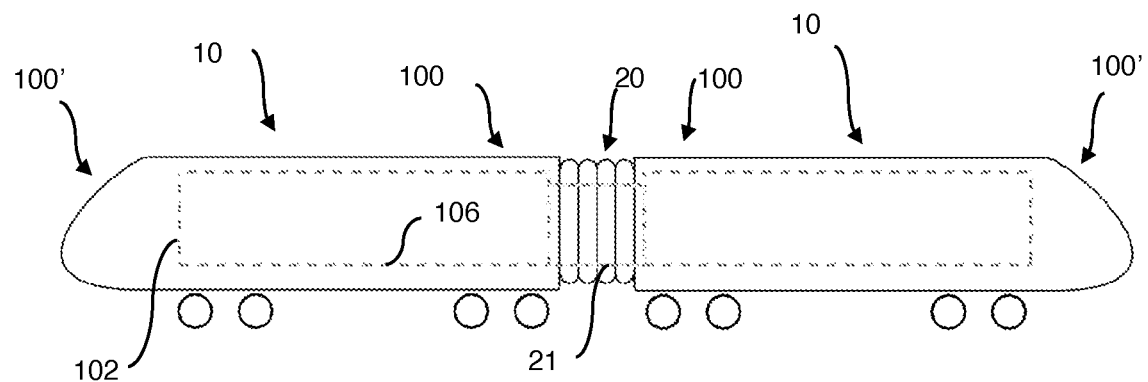
FIG. 1 is a side view of an example railway vehicle comprising two rail vehicles and an interconnection gangway.
Figure 2:
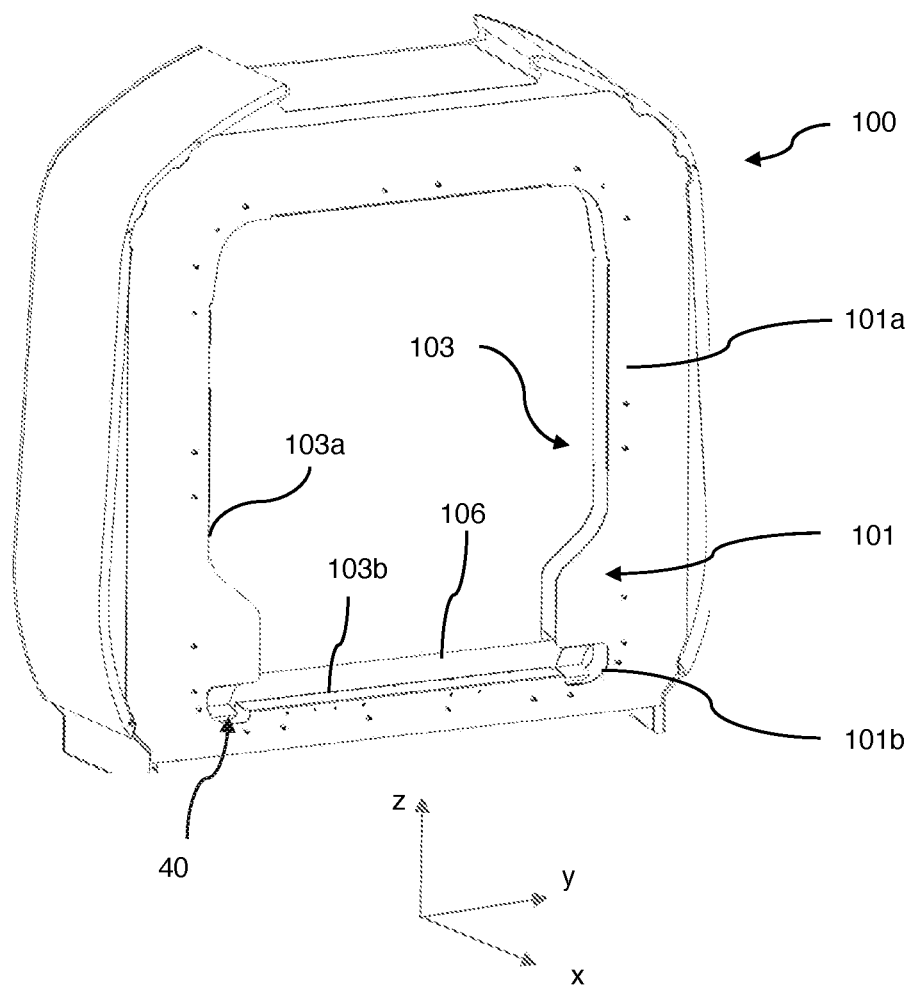
FIG. 2 is an outer perspective view of an end wall section according to the invention.

With reference to FIG. 1 and FIG. 2, a set of rail vehicles 10, each rail vehicle 10 comprises a first end 100 and a second end 100'. At least one end 100 has an end wall 101 to which a gangway 20 is connected. Footplate catchers 40 are provided, and located within the end wall 101. The gangway 20 provides passengers with a safe and comfortable means to move from one rail vehicle to the adjacent rail vehicle. One side of the gangway 20 is connected to the end wall and on the opposite side, to an adjacent rail vehicle. An inner lining 22 defines an interior space of the gangway 20. The interior space dedicated to accommodating passengers extends along the full length of the gangway 20 and defines a passage 21.

The end wall 101 further provides passengers with an access means towards the adjacent rail vehicle. In particular, the access means can be a doorway 103. The doorway 103 allows passengers to walk from the usable space 102 towards the passage 21 and the adjacent rail vehicle. In other words, the passage 21 prolongs the doorway 103 in the longitudinal direction. The doorway comprises lateral walls 103a and a threshold 103b. The threshold 103b is substantially flush with a floor 106 of the usable space 102.

Further shown is a coordinate system comprising a vertical axis z, the longitudinal axis x and lateral/transverse axis y. These axes x, y, z provide a Cartesian coordinate system, wherein the vertical axis z extends vertically. The longitudinal axis x can be a roll axis of the rail vehicle, wherein the lateral axis y can be a pitch axis of the rail vehicle.

Figure 3:
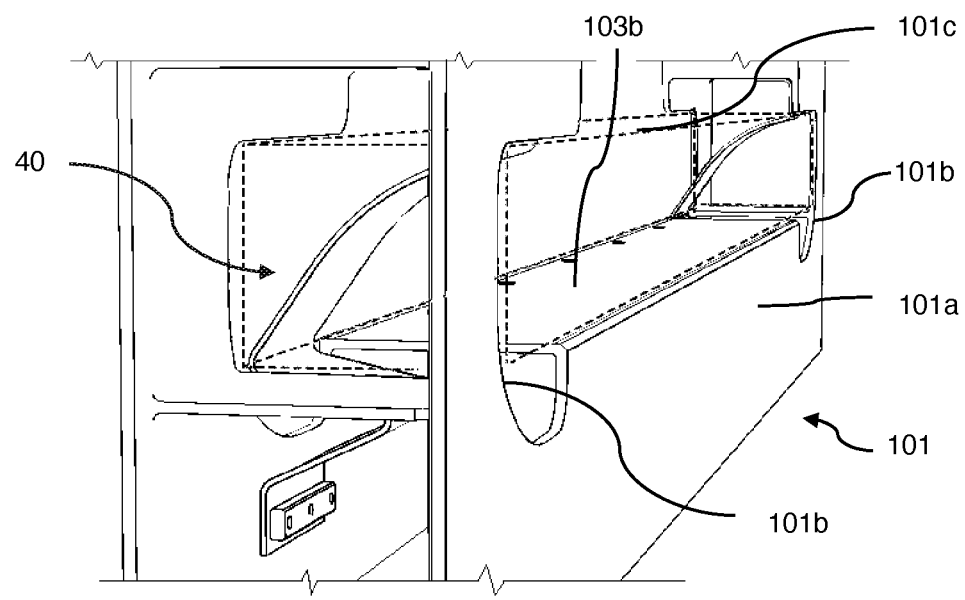
FIG. 3 is an enlarged fragmentary perspective view of a lower portion of the doorway of FIG. 2.

FIG. 3 is an enlarged fragmentary perspective view of a bottom portion of the doorway. A recess 101c is provided in the lower section of the end wall 101. In particular, the recess 101c is provided at the bottom of the doorway 103. The lower part of the recess 101c is formed essentially by the threshold 103b. In a transverse plane perpendicular to the longitudinal direction, the recess 101c, is defined by the upper parts and the side parts of two notches 101b. The recess 101c extends in the longitudinal direction, over the entire thickness of the end wall 101. The recess 101c is adapted to receive at least one loose footplate 31, 32 from the set of footplates 300, in that the width and height of the recess 101c are greater than the width and height of the footplates.

Figure 4:
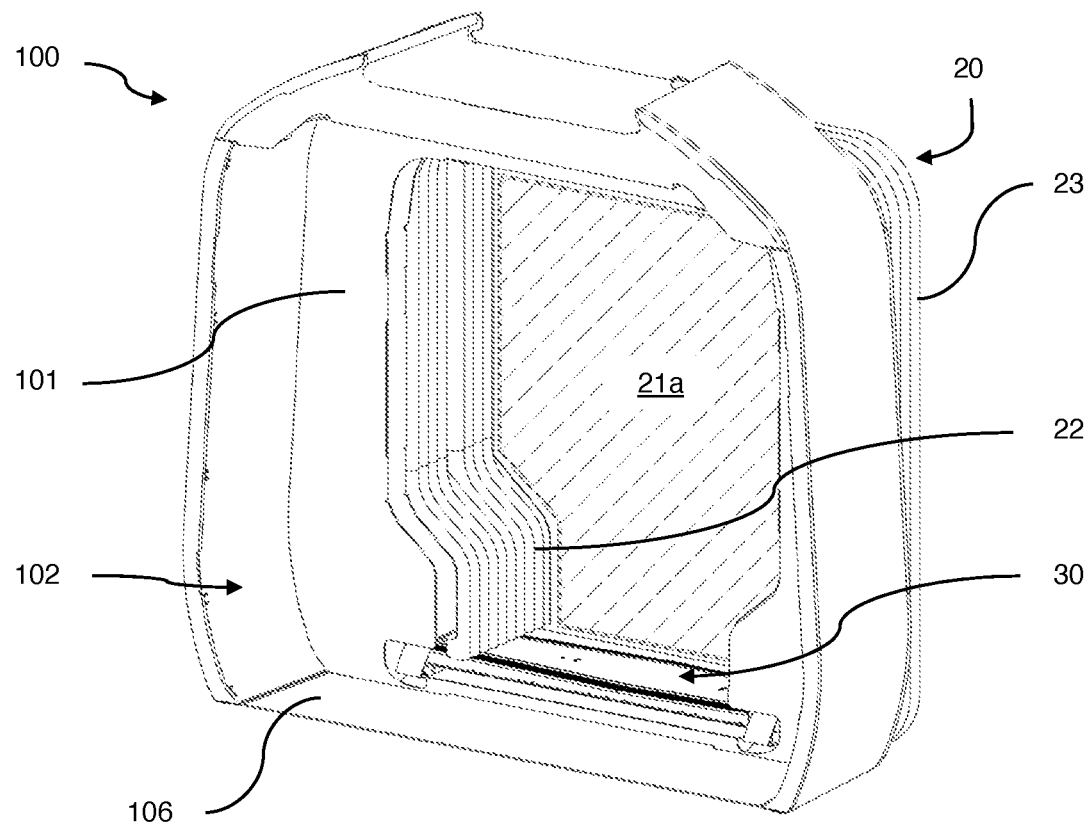
FIG. 4 is an inner perspective view of an end wall section according to the invention and a gangway.

FIG. 4 is an enlarged fragmentary inner perspective view of a rail vehicle end 100. The rail vehicle end 100 includes an end section of the usable space 102. The usable space 102 ends with the end wall 101 comprising mainly hollow profile elements. A conventional interconnection gangway 20 flexibly connects the rail vehicle end 100 an adjacent rail vehicle end (not shown) belonging to an adjacent rail vehicle. The gangway 20, here represented entirely, comprises an outer bellow 23, an inner bellow comprising an inner lining 22 and a bridge assembly 30 providing access to the adjacent rail vehicle. The inner lining 22 surrounds the passage 21 section of the gangway 20. The passage 21 is defined by its cross-section 21a and the length of the gangway 20.

Figure 5:
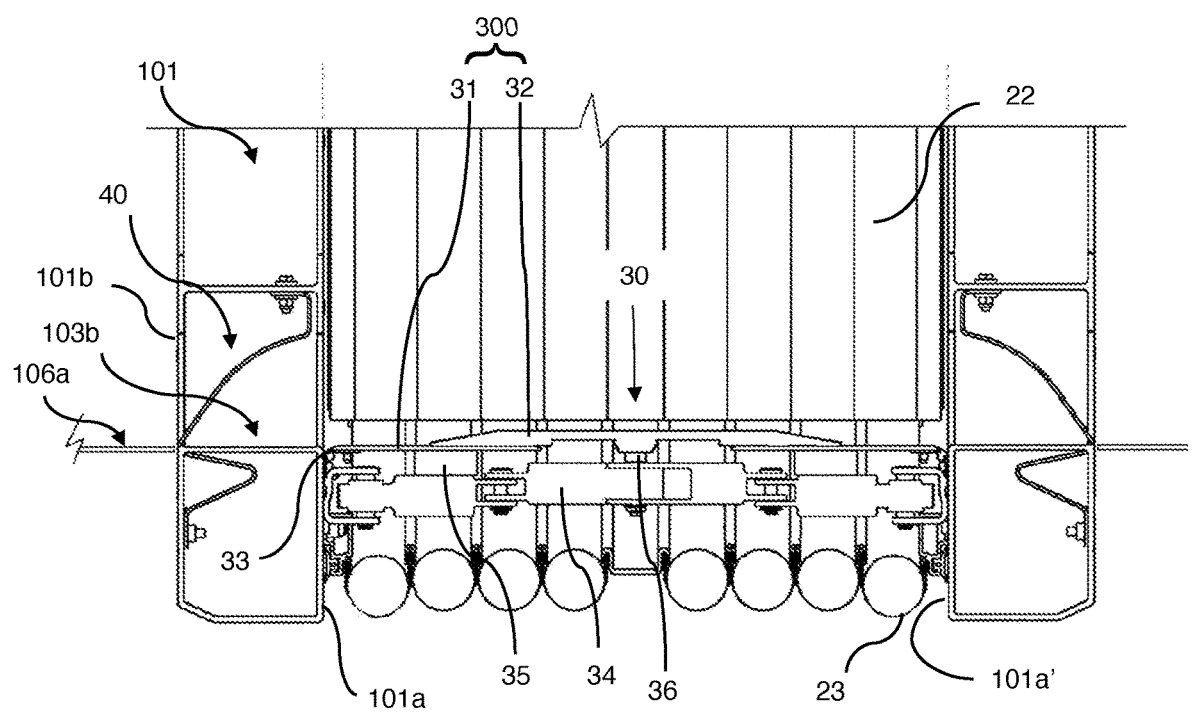
FIG. 5 is an enlarged cross-sectional view of the lower portion of a conventional gangway bridge assembly between two rail vehicles, parallel to the vertical median plane, under normal conditions.

FIG. 5 is a cross-sectional view showing the bridge assembly 30. The bridge assembly 30 defines a lower limit of the passage 21, substantially aligned with the floor level 106a. The bridge assembly 30 allows passengers to walk through the gangway 20. The bridge assembly 30 comprises a set of one or more footplates 300 resting on a scissor-type frame 34 and connected to the end wall 101. The set of one or more footplates 300 comprises bridge plates 31 attached to the end faces 101a, and a central treadplate 32 resting partly on the bridge plate 31 and on the scissor type frame 34.

The scissor-type frame 34 is extensible and is flexibly connected to both end faces 101a, 101a' of the adjacent rail vehicles. The scissor-type frame 34 can accommodate relative movements between the rail vehicles, as occurs in normal operation of a set of rail vehicles. The scissor-type frame 34 is used to support the weight of passengers walking through the passage 21, more specifically passengers walking on the bridge assembly 30.

The gangway 20 and the bridge assembly 30 are substantially symmetrical in a plane perpendicular to the longitudinal direction, and which includes the center of the treadplate 32, so that the following description will be limited to the left portion of FIG. 5. A proximal end of the bridge plate 31 is located along the end face 101a and connected to the end face 101a via a pivot joint in form of a horizontal hinge 33. The distal end of the bridge plate 31 is resting on a sliding element 35, the sliding element 35 being supported by the scissor-type frame 34. The thickness of the sliding element 35 is such that the bridge plate 31 is maintained in a substantially horizontal position when the rail vehicle is travelling on a flat track, i.e. when there is no vertical offset, nor pitch, between the two adjacent rail vehicles. The free-end of the treadplate 32 can slide on the bridge plates 31 while the central portion of the treadplate 32 is connected via a treadplate bolt to the scissor-type frame 34 supporting the treadplate 32. In normal operation, the load of passengers resting or walking on the bridge assembly 30 is thus mainly supported by the scissor-type frame 34.

Figure 6:
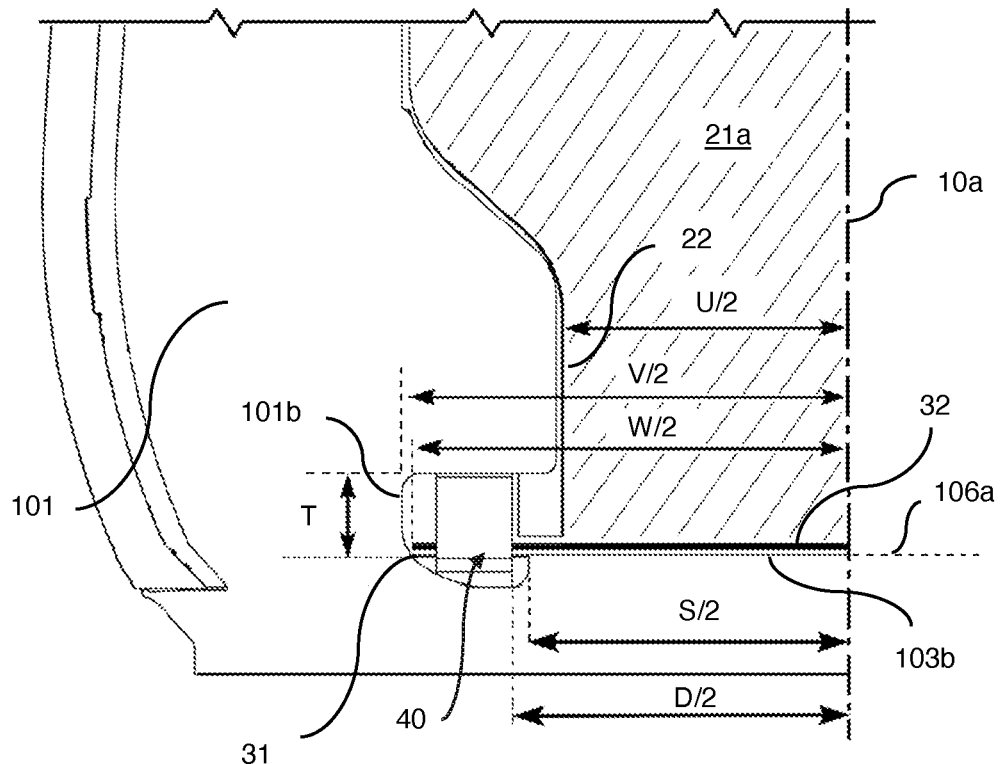
FIG. 6 is an enlarged fragmentary view of the lower left corner of FIG. 4 in a transverse vertical plan, seen from the usable space.

As can be seen in FIG. 6, the width of the set of one or more footplates is represented by the distance (W).

In this embodiment a notch 101b is provided at the bottom corner of the doorway 103. A second notch 101b (not shown) is provided and located at a symmetric location on the other side of the doorway. Both notches 101b are symmetrical with regards to a vertical median plane 10a of the rail vehicle 10. The notches 101b ends transversally at a distance (V/2) from the vertical median plane 10a, (V) being the width of the recess 101c. The distance V is greater than the width (W), so that the recess 101c can receive the set of footplates 300. More specifically, the recess 101c can receive either one, or both, of the treadplate 32 and the bridge plate 31, should they become loose and move towards the usable space 102

The distance (U) represents the width of the lower portion of the passage 21, while the width of the threshold 103b is represented by the distance (S), which can be greater than U or equal to U.

In a vertical direction, the lower part of the notches 101b extend below the threshold 103b, and below the footplates 31, 32 whereas the higher part extends to a level above the set of footplates 300, represented by the vertical distance (T).

When the 2 adjacent rail vehicles are horizontally aligned, the bridge plate 31 is substantially at the same level as the threshold 103b and the floor level 106a. Since the treadplate 32 is sliding over the bridge plate 31, the treadplate 32 is thus located in a horizontal plane slightly above the threshold 103b. The notch 101b is located behind the inner lining 22, so that the footplate catchers are not visible to passengers.

Figure 7:
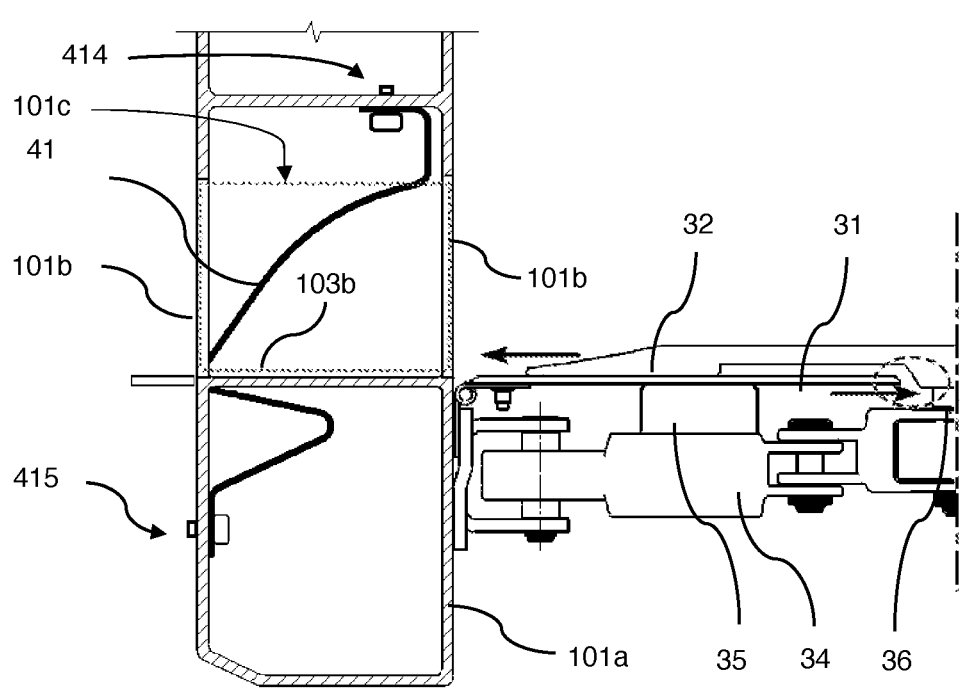
FIG. 7 is an enlarged fragmentary view of the lower left portion of FIG. 5, upon collision of the rail vehicles.

The effect of a collision on the bridge assembly 30 of FIG. 5 is represented in FIG. 7, although here limited to half of the length of the gangway 20. For clarity purpose, the outer below 23 and the inner lining 22 are not shown. The distance between the end face 101a and the middle section of the gangway 20, which is represented by the longitudinal location of the center of the treadplate 32, decreased. The bridge plate 31 slid essentially horizontally between the treadplate 32 and the sliding element 35, towards the adjacent rail vehicle, thus reducing the gap between the distal end the bridge plate 31 and the treadplate bolt 36.

It can easily be understood from FIG. 7, especially considering the area highlighted by the dotted-line ellipse, that a further decrease of the distance between the adjacent rail vehicles will see the distal end of the bridge plate 31 collide with the treadplate bolt 36. The bridge plate 31 will sever the connection between the treadplate 32 and the scissor-type frame 34 thus releasing the treadplate 32. In such occurrence, the treadplate 32 becomes loose. As the distance continues to decrease and the impact energy dissipates, the loose treadplate 32 will thrust towards the usable space 102, more specifically through the end wall 101, more specifically through the recess 101c. When thrusting through the recess 101c, the loose treadplate 32 will subsequently meet with the footplate catchers 40. More specifically, the loose treadplate 32 would be stopped by the retainers 41.

The shape of the retainers 41 is operative to orientate at least one loose footplate 31, 32 from the set of footplates 300 towards the threshold 103b when the at least one loose footplate 31, 32 moves towards the usable space 102. The retainers 41 are located preferably beyond the inner lining 22 of the gangway 20 in the transverse direction, at a distance D from each other. The distance D is greater than the distance U and greater than S (as is represented in FIG. 6). It can be easily understood from FIG. 7 that if the connection between the bridge plate 31 and the hinge 33 is severed in a collision, or the hinge 33 connecting the bridge plate 31 to the end wall teared off from the end face 101a, a loose bridge plate 31 may also thrust towards the usable space 102 and be stopped by the retainers 41.

Figure 8:
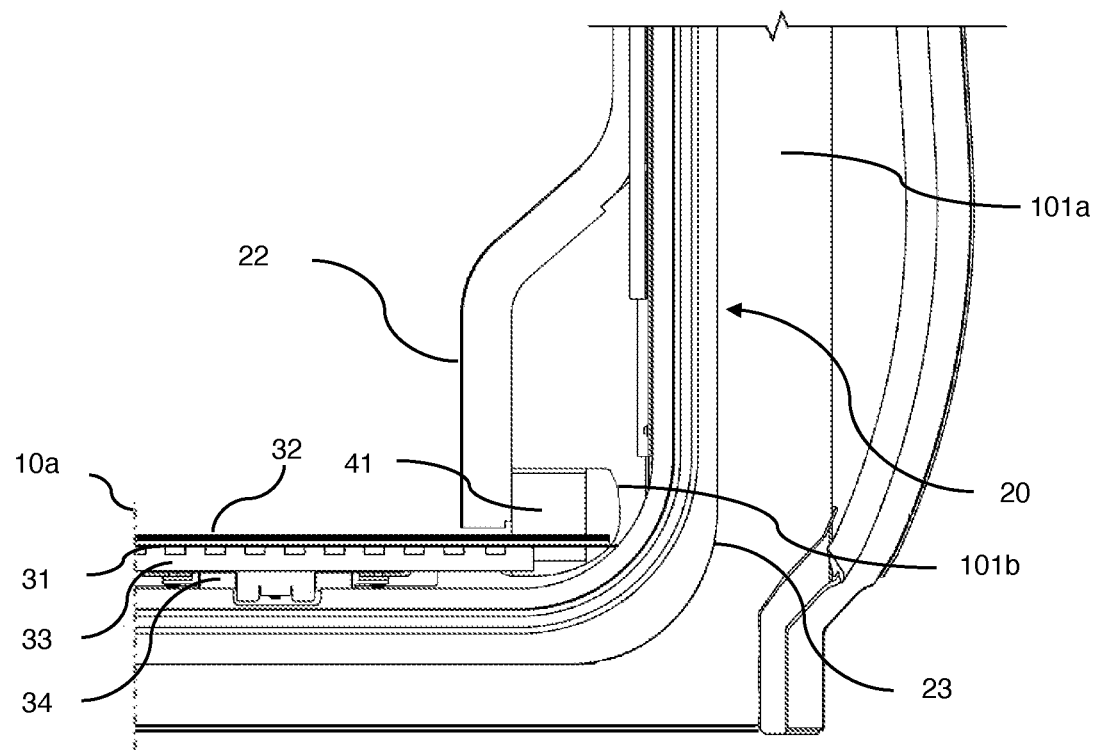
FIG. 8 is a view of the enlarged fragmentary view of FIG. 6, seen from the outside.

The front view of FIG. 6 is shown on FIG. 8, seen from outside the rail vehicle 10. The gangway 20 is at the foreground whereas the end wall 101 is in the background. The end wall receives the retainers 41, within the notches 101b. The lower portion of the inner lining 22 ends slightly above the bridge assembly 30, so that it does not interfere with inherent movements of either footplates 31, 32 when the set of rail vehicles is in commercial service.

Figure 9:
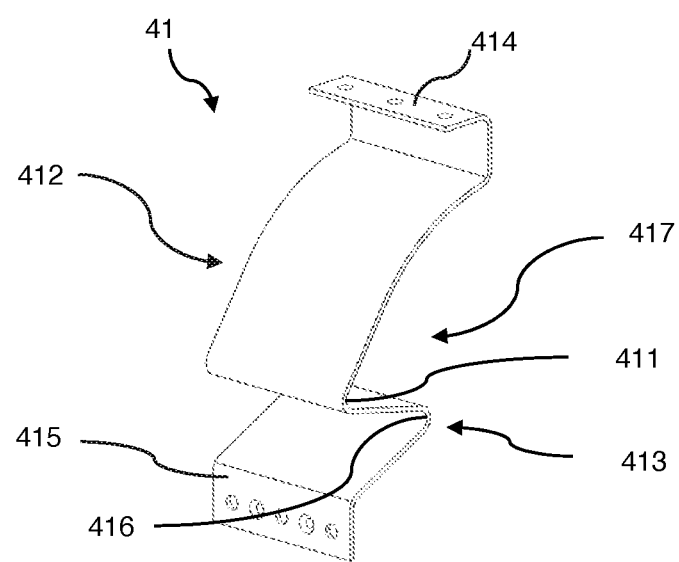
FIG. 9 depicts an example retainer according to the invention.

One retainer 41 is shown on FIG. 9. The retainer comprises a sheet metal element. The retainer includes a stop 411 for stopping a loose footplate 31, 32. The stop 411 can be obtained by bending the metal sheet element. The retainer 41 has a first leg 412 extending upwards and a second leg 413 extending downwards, first and second leg 412, 413 extending from the stop 411 and forming an indentation 417 for receiving at least one loose footplate 31, 32. The first leg 412 acts as a guide for a loose footplate, guiding the footplate towards the stop 411 and towards the threshold 103b. In the embodiment depicted in FIG. 7, the stop 411 is adjacent to the floor level 106a.

The retainer 41 has a first mounting interface 414 extending from the first leg 412 and/or a second mounting interface 415 extending from the second leg 413. The second leg 413 comprises a further bend 416, said further bend 416 arranged between the stop 411 and the second mounting interface 415. In the present embodiment, the stop 411 and the second mounting interface 415 are, at least essentially, arranged on a common plane. First and/or second mounting interfaces are adapted for mounting at a mounting surface of the carbody shell, in particular at the end wall 101. As can be seen from FIG. 7, a first mounting surface of the end wall, consisting of an intermediate rib from the end wall, extends essentially perpendicular to an inner plate of the end wall which defines a second mounting surface of the end wall (to improve a form fit between the retainer 41 and the end wall 101). In this particular configuration, the retainer 41 is of a substantially S-shape.

Retainers 41 are designed so that they can deform upon impact of a loose footplate 31, 32. The S-shape of the retainers 41, and more specifically the bend 416, provides elasticity to the footplate catchers 40 and help absorbing the energy from a thrusting footplate 31, 32. Upon collision, the retainers 41 can unfold and, while they unfold, dissipate the kinetic energy from the loose footplate 31,32 moving towards the usable space 102.

The invention claimed is:
1. A rail vehicle, comprising:
a carbody shell, the carbody shell having an end wall and a usable space,
said end wall comprising a doorway for providing access to said usable space,
said doorway comprising lateral walls and a threshold with one or more footplates,
wherein said end wall further comprises at least two footplate catchers located laterally at a distance from each other, each laterally outside said threshold, for preventing the one or more footplates having a footplate width greater than (A) a threshold width and (B) the distance between the at least two footplate catchers from entering the usable space.
2. The rail vehicle according to claim 1, wherein the end wall further comprises a substantially horizontal recess provided at the bottom of the doorway, said recess having a recess width greater than the footplate width of the set of one or more footplates.

3. The rail vehicle according to claim 2, wherein the recess comprises at least two notches located at least partially at two opposite bottom corners of the doorway.

4. The rail vehicle according to claim 3, wherein at least one of the footplate catchers comprises at least one retainer for stopping and/or holding at least one loose footplate from the set of one or more footplates, the retainer being arranged at least partially within the recess.

5. The rail vehicle according to claim 4, wherein at least one of the footplate catchers comprises two retainers, each retainer being located on either side of the doorway, wherein the retainers are located at least partially within a transverse span of the footplates.

6. The rail vehicle according to claim 5, wherein the retainers are located outside a passage through the gangway.

7. The rail vehicle according to claim 6, wherein the retainers are located beyond an inner lining of the gangway, in a transverse direction, rendering the footplate catcher invisible to the passengers.

8. The rail vehicle according to claim 7, wherein the retainers comprise a curved plate connected to the carbody shell, in particular to the end wall.

9. The rail vehicle according to claim 8, wherein the retainers are provided with a stop, a first leg and a second leg, the first leg extending from the stop in a direction upwards, the second leg extending from the stop in a direction downwards, at least one leg having its extremity connected to the carbody shell.

10. The rail vehicle according to claim 7, wherein the retainer provides an indentation for receiving the at least one loose footplate.

11. The rail vehicle according to claim 9, wherein the retainer is substantially S-shaped.

12. A set of rail vehicles comprising at least two rail vehicles and a gangway arranged between said two rail vehicles, at least one of said rail vehicles comprising:
a carbody shell, the carbody shell having an end wall and a usable space,
said end wall comprising a doorway for providing access to said usable space,
said doorway comprising lateral walls and a threshold with one or more footplates,
wherein said end wall further comprises at least two footplate catchers located laterally at a distance from each other, each laterally outside said threshold, for preventing a set of one or more footplates having a footplate width greater than (A) a threshold width and (B) the distance between the at least two footplate catchers from entering the usable space, wherein the gangway comprises at least one footplate, and
wherein at least one of the footplate catchers is located on a path of a loose footplate and is operative to prevent said loose footplate from entering said usable space in an event of a collision.

13. The set of rail vehicles according to claim 12, wherein the set of rail vehicles is provided with pairs of footplate catchers opposing each other in the longitudinal direction.

* * * * *